(12) United States Patent
Kato et al.

(10) Patent No.: US 7,355,774 B2
(45) Date of Patent: Apr. 8, 2008

(54) OPTICAL DEFLECTOR AND OPTICAL APPARATUS USING THE SAME

(75) Inventors: Takahisa Kato, Tokyo (JP); Yukio Furukawa, Palo Alto, CA (US); Yasuhiro Shimada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/739,968

(22) Filed: Apr. 25, 2007

(65) Prior Publication Data

US 2007/0273946 A1  Nov. 29, 2007

(30) Foreign Application Priority Data

May 26, 2006  (JP)  .............. 2006-147307

(51) Int. Cl.
*G02B 26/08* (2006.01)
(52) U.S. Cl. .................................. 359/224
(58) Field of Classification Search ......... 359/223–226
See application file for complete search history.

(56) References Cited

U.S. PATENT DOCUMENTS

| | | | |
|---|---|---|---|
| 4,859,846 A | 8/1989 | Burrer | 250/234 |
| 5,526,176 A | 6/1996 | Furukawa | 359/344 |
| 6,900,925 B2 | 5/2005 | Kato et al. | 359/298 |
| 7,031,041 B2 * | 4/2006 | Mi et al. | 359/224 |
| 7,039,077 B2 | 5/2006 | Furukawa et al. | 372/21 |
| 7,220,009 B2 * | 5/2007 | Shimada et al. | 359/224 |
| 2006/0152785 A1 | 7/2006 | Yasuda et al. | 359/199 |
| 2006/0198006 A1 | 9/2006 | Kato et al. | 359/224 |
| 2007/0144867 A1 | 6/2007 | Torashima et al. | 198/346.1 |

OTHER PUBLICATIONS

G. Barillaro, et al., "Analysis, Simulation and Relative Performances of Two Kinds of Serpentine Springs," J. Micromech. Microeng. 15 (2005), pp. 736-746.
T.D. Kudrie, et al., "Single-Crystal Silicon Micromirror Array With Polysilicon Flexures," Sensors and Actuators A 119 (2005), pp. 559-566.

* cited by examiner

*Primary Examiner*—Euncha P. Cherry
(74) *Attorney, Agent, or Firm*—Fitzpatrick Cella Harper Scinto (57) ABSTRACT

An optical deflector comprises a vibration system and a driver. The vibration system includes a first oscillatory moving element having a reflecting surface, a second oscillatory moving element, and a support. The first and second oscillatory moving elements are resiliently supported respectively by first and second torsion springs to be able to torsionally vibrate about an oscillation axis with respect to the second oscillatory moving element and to the support. The vibration system has natural oscillation modes with different frequencies about the oscillation axis. The first and/or second torsion spring has torsion leaf portions torsionally deformed about torsion axes parallel to the oscillation axis. One end of each torsion leaf portion is coupled to an end of another through a connecting portion, and the other end is coupled to one of the first and the second oscillatory moving elements and the support directly or through a connecting portion.

8 Claims, 9 Drawing Sheets

OPTICAL DEFLECTOR AND OPTICAL APPARATUS USING THE SAME

BACKGROUND OF THE INVENTION

1. Field of the Invention

The present invention relates to an optical deflector and an optical apparatus, such as an image forming apparatus and a display, using the optical deflector. The optical deflector is suitably used in, e.g., a projection display for projecting an image with a deflection scan of light and an image forming apparatus which includes an electrophotographic process, such as a laser beam printer and a digital copying machine.

2. Description of the Related Art

Hitherto, optical deflectors have been proposed in various forms of optical scanning systems or optical scanning apparatuses for sinusoidally vibrating a moving element, which has a reflecting surface, to deflect a light. The optical scanning system using the optical deflector, which causes sinusoidal vibrations utilizing a resonance phenomenon, has different features in comparison with the optical scanning system using a rotating mirror such as a rotatable polygon mirror. For example, the optical scanning systems, the size of the optical deflector can be reduced and power consumption is small. Further, an optical deflector made of a single Si crystal, which is manufactured by a semiconductor process, is theoretically free from metal fatigue and has durability.

Figure 13:
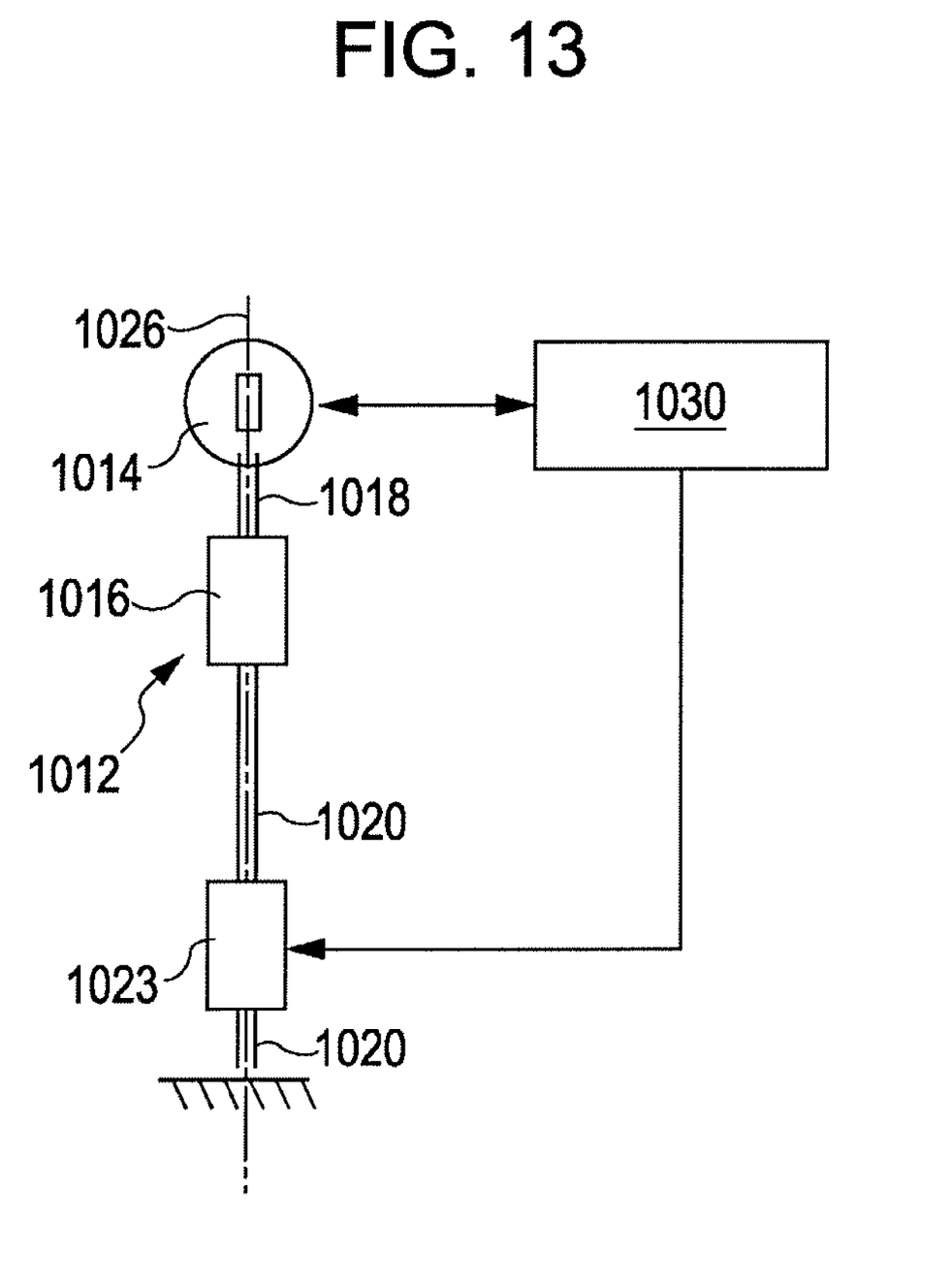
FIG. 13 is a block diagram for explaining a known optical deflector.

For optical deflectors utilizing the resonance phenomenon, there is known a technique for simultaneously exciting two or more natural oscillation modes in the torsional vibrating direction and causing an optical scan other than the sinusoidal optical scan. More specifically, an optical deflector is proposed in U.S. Pat. No. 4,859,846 (hereinafter "Patent Document 1"), in which two or more natural oscillation modes are simultaneously excited about the same axis, to thereby perform a triangular scan at an essentially constant angular speed. FIG. 13 is a block diagram for explaining the optical deflector, disclosed in Patent Document 1, in which two natural oscillation modes are simultaneously excited to perform a triangular scan at an essentially constant angular speed.

The disclosed optical deflector 1012 comprises a first moving element (mass) 1014, a second moving element (mass) 1016, a first torsion spring 1018 for resiliently coupling and supporting the first and second moving elements, and a second torsion spring 1020 for supporting the second moving element 1016 and a mechanical ground surface 1023. Those components are all caused to torsionally vibrate about a torsion axis 1026 by a driver 1030. The first moving element 1014 has a reflecting surface to deflect a light. Thus, a light from a light source is deflected to make a scan by the torsional vibrations of the first moving element 1014. For the torsional vibrations about the torsion axis 1026, the optical deflector 1012 has a primary natural oscillation mode at a fundamental frequency and a secondary natural oscillation mode at nearly third harmonic frequency triple the fundamental frequency. The driver 1030 drives the optical deflector 1012 at two frequencies, i.e., the frequency of the primary natural oscillation mode and the frequency of the secondary natural oscillation mode, which is in phase with the former frequency and is triple. In other words, the optical deflector 1012 causes the torsional vibrations not only in the primary natural oscillation mode, but also in the secondary natural oscillation mode at the same time. Accordingly, a displacement angle in the deflection scan of the light reflected by the first moving element 1014 is given by superimposition of the two vibration modes and is changed following a nearly triangular waveform instead of a sine waveform. As a result, an angular speed of the deflection scan is held essentially constant over a wider region than the case where the displacement angle is changed following the sine waveform, and, thus, a practically available region can be increased with respect to the overall region of the deflection scan.

Figure 12A:
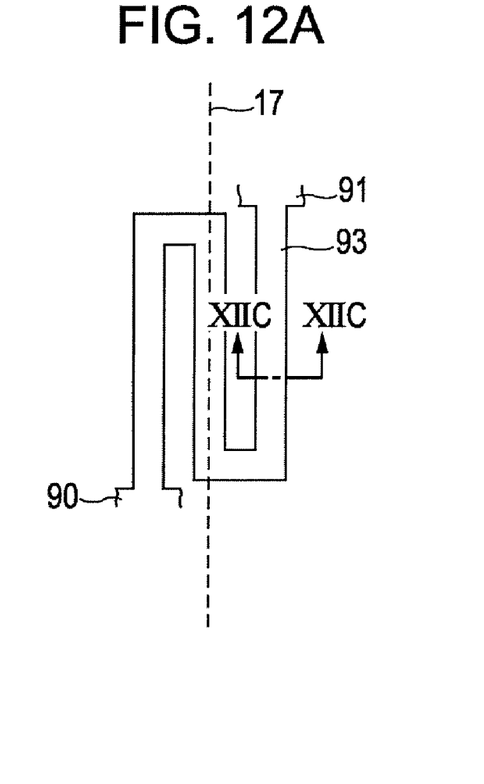
FIG. 12A is a plan view of a known torsion spring having a meander structure.
Figure 12B:
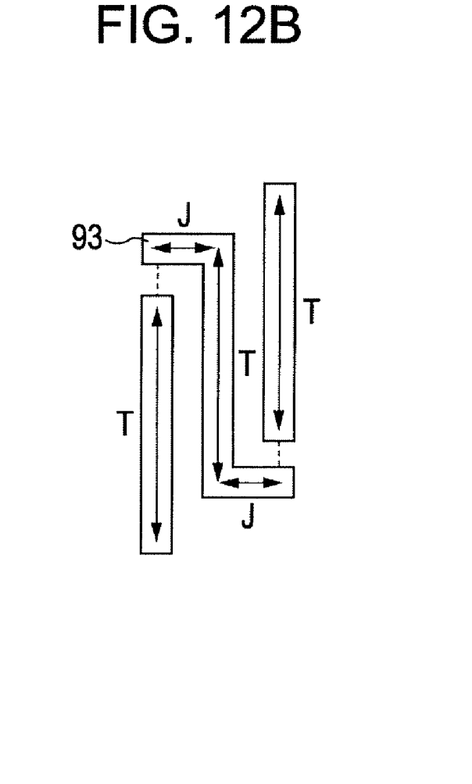
FIG. 12B is a schematic view showing functional components of the known torsion spring.
Figure 12C:
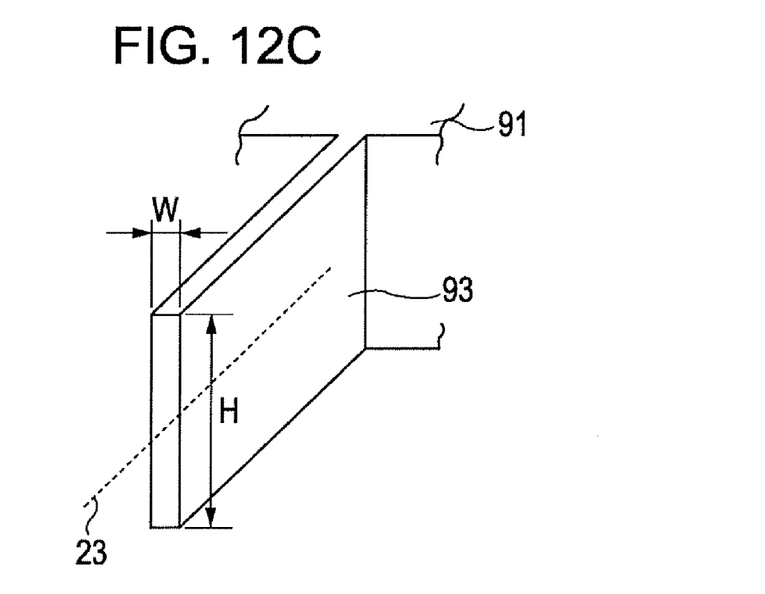
FIG. 12C is a perspective sectional view of the known torsion spring.

On the other hand, a meander structure is known as a small-sized spring structure manufactured by the semiconductor process. See Barillaro et al,., "Analysis, simulation and relative performances of two kinds of serpentine springs", Journal of Micromechanics and Microengineering, 15(2005) PP736-746 (hereinafter "Non-Patent Document 1"). FIGS. 12A-12C show one example of the meander structure described in Non-Patent Document 1. FIG. 12A is a plan view, FIG. 12B illustrates a similar structure portion repeated, and FIG. 12C is a perspective sectional view taken along a section plane XIIC-XIIC in FIG. 12A, looking in the direction of an arrow. As shown in FIG. 12A, a meander spring 93 is formed to extend from a movable end 90 to a fixed end 91 in the illustrated shape. The meander spring 93 has a rectangular cross-section with a width of W and a thickness of H, as shown in FIG. 12C.

Considering contributions to a torsion spring constant $K_\theta$, as shown in FIG. 12B, the meander spring 93 can be approximated by a structure that flexible springs with a length J and a torsion spring with a length T are coupled to each other in series. Thus, in the illustrated spring structure, a plurality of flexible springs and a plurality of torsion springs are coupled to each other essentially in series between the movable end 90 and the fixed end 91. Therefore, the torsion spring constant $K_\theta$ can be reduced with respect to a torsional displacement about an oscillation axis 17 with the repetition of the similar structure portion. Such a point can be theoretically understood from studies taking into account the number of the repeated similar structure portions, the transverse elastic coefficient of the spring material, and the longitudinal elastic coefficient of the spring material.

When a condition of $J<<T$ is satisfied, this essentially means a structure in which the torsion springs each having the length T and a torsion axis 23 parallel to the oscillation axis 17 are coupled to each other. In such a case, the torsion spring constant $K_\theta$ can also be reduced by increasing the number of the torsion springs without increasing a total length. Further, as understood from the above-suggested theoretical studies, since the torsion spring constant $K_\theta$ is substantially in linear proportion to the thickness H, a relatively low spring constant can be obtained even when the thickness H is large. On the other hand, the torsion spring constant $K_\theta$ is substantially in proportion to the third power of the width W.

There is known an example of applying the above-described feature to a spring structure used in the semiconductor manufacturing process in which it is difficult to select the thickness of the spring material as a free design parameter (e.g., a spring structure in an optical deflector). See Kudrle et al., "Single-crystal silicon micromirror array with polysilicon flexures", Sensor and Actuators, A119(2005) PP559-566.

In the vibration systems having a plurality of oscillatory moving elements and a plurality of torsion springs, unless the frequencies of the natural oscillation modes as driving targets are adjusted to desired values, the relationship among those frequencies affects the oscillatory vibration of the oscillatory moving element which deflects and scans a light, thus degrading not only the scanning frequency, but also the scanning waveform.

However, when the above-described known vibration systems are reduced in size, non-linearity of the torsion spring is noticeable. Such a drawback has impeded a size reduction of the optical deflector because of a difficulty in inspecting and adjusting the frequencies of the natural oscillation modes as the driving targets.

SUMMARY OF THE INVENTION

In view of the above-mentioned state of the art, the present invention provides an optical deflector having a structure which enables frequencies of plural natural oscillation modes to be easily adjusted regardless of a size reduction.

The optical deflector according to the present invention comprises a vibration system and a driver for driving the vibration system. The vibration system includes a first oscillatory moving element, a second oscillatory moving element, and a first torsion spring arranged to couple the first and second oscillatory moving elements and to support the first oscillatory moving element in an oscillating relation to the second oscillatory moving element. The vibration system further includes a support, and a second torsion spring arranged to couple the support and the second oscillatory moving element and to support the second oscillatory moving element in an oscillating relation to the support coaxially with an oscillation axis of the first oscillatory moving element. At least one of the first and second oscillatory moving elements has a light deflecting element. The vibration system has at least two natural oscillation modes with different frequencies about the oscillation axis.

In addition, at least one of the first torsion spring and the second torsion spring has a plurality of torsion leaf portions which are torsionally deformed about respective torsion axes parallel to the oscillation axis, and which are arranged in a direction perpendicular to the oscillation axis. One of ends of each torsion leaf portion is coupled to an end of another torsion leaf portion through a connecting portion, and the other end of each torsion leaf portion is coupled directly, or through a connecting portion to at least one of another torsion leaf portion, the first oscillatory moving element, the second oscillatory moving element, and the support.

An optical apparatus according to the present invention, which is constituted as, e.g., an image display apparatus or an image forming apparatus, comprises a light source, the above-described optical deflector, and one of a photosensitive member and an image display member. The optical deflector deflects a light from the light source such that at least a part of the light exposes the photosensitive member.

An optical apparatus according to the present invention, which is constituted as, e.g., an image display apparatus or an image forming apparatus, comprises a light source, the above-described optical deflector, and one of a photosensitive member and an image display member. The optical deflector deflects a light from the light source such that at least a part of the light is projected on an image display member.

With the optical deflector according to the present invention, the structure enabling the frequencies of the plural natural oscillation modes to be inspected and adjusted relatively easily can be obtained even when a deflector size is reduced. Detailed reasons will be described later in the description of exemplary embodiments of the present invention.

Further features of the present invention will become apparent from the following description of exemplary embodiments with reference to the attached drawings.

DESCRIPTION OF THE EMBODIMENTS

A basic embodiment of the present invention will be described below. A structure having a small size and enabling frequencies of plural natural oscillation modes to be adjusted easily can be obtained by using a spring structure with superior linearity.

According to the present invention, an optical deflector for deflecting and scanning a light from a light source or the like comprises a vibration system and a driver for driving the vibration system by, e.g., electromagnetic forces or static electrical forces.

The vibration system includes a first oscillatory moving element, a second oscillatory moving element, and a first torsion spring arranged to couple the first and second oscillatory moving elements and to support the first oscillatory moving element in an oscillating relation to the second oscillatory moving element. The vibration system further includes a support, and a second torsion spring arranged to couple the support and the second oscillatory moving element and to support the second oscillatory moving element in an oscillating relation to the support coaxially with an oscillation axis of the first oscillatory moving element.

The support is fixed to a stationary body, and a part of the driver is also fixed to the stationary body.

At least one of the first and second oscillatory moving elements has a light reflecting surface which serves as a light deflecting element. The light deflecting element can be disposed on one or both of the first and second oscillatory moving elements.

The vibration system has at least two natural oscillation modes with different frequencies about the oscillation axis.

In addition, at least one of the first torsion spring and the second torsion spring has a plurality of torsion leaf portions which are torsionally deformed about respective torsion axes parallel to the oscillation axis, and which are arranged in a direction perpendicular to the oscillation axis. One of ends of each torsion leaf portion is coupled to an end of another torsion leaf portion through a connecting portion, and the other end of each torsion leaf portion is coupled directly, or through a connecting portion, to at least one of another torsion leaf portion, the first oscillatory moving element, the second oscillatory moving element, and the support.

Typically, the torsion spring having the plurality of torsion leaf portions has a meander structure in which the torsion leaf portions have two or more cross-sections when cut along a plane perpendicular to the oscillation axis. In particular, the first torsion spring can be selected as the torsion spring having the plurality of torsion leaf portions.

Figure 5A:
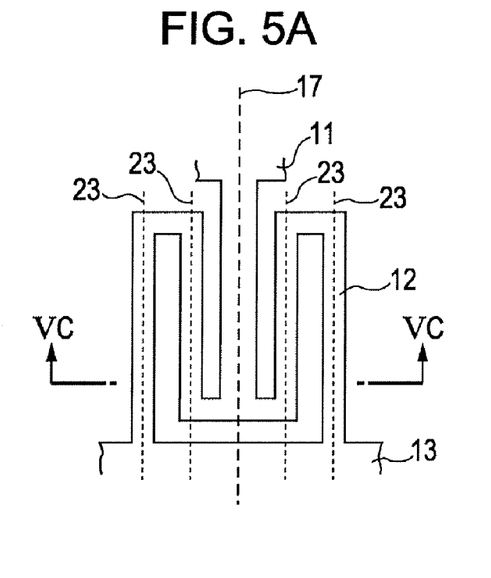
FIG. 5A is a plan view of a first torsion spring of the optical deflector according to the first exemplary embodiment of the present invention.
Figure 5B:
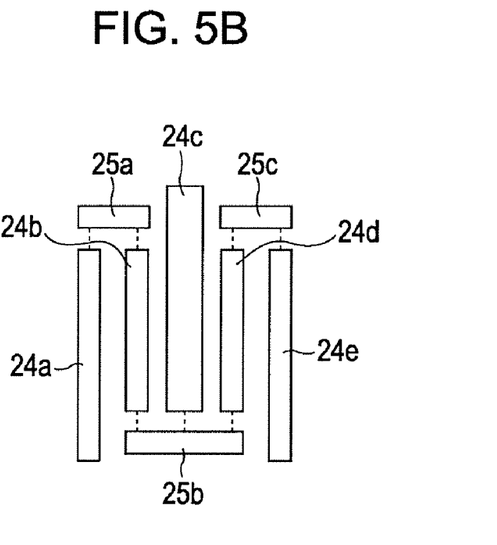
FIG. 5B is a schematic view showing functional components of the first torsion spring of the optical deflector according to the first exemplary embodiment of the present invention.
Figure 5C:
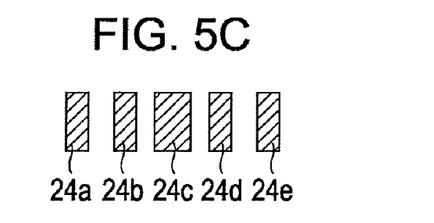
FIG. 5C is a sectional view of the first torsion spring of the optical deflector according to the first exemplary embodiment of the present invention.

As shown in FIG. 5A and FIG. 5C, when the first torsion spring 12 is cut along the section plane VC-VC perpendicular to the oscillation axis 17, it has five cross-sections corresponding to the torsion leaf portions 24a, 24b, 24c, 24d and 24e.

In this specification, such an arrangement in FIG. 5A as providing a plurality of cross-sections of the coupled torsion leaf portions (24a, 24b, 24c, 24d and 24e), which are parallel to the oscillation axis 17, is called a meander structure (FIG. 12A is also the meander structure).

Figure 9A:
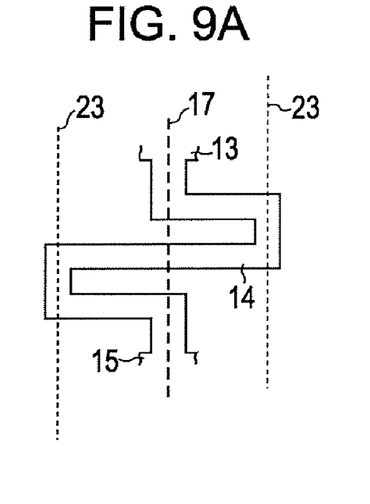
FIG. 9A is a plan view of a torsion spring of an optical deflector according to a modification of the second exemplary embodiment of the present invention.

On the other hand, in this specification, the spring structure as shown in FIG. 9A, is called a serpentine structure (not meander structure). The number of cross-sections of the serpentine structure perpendicular to the oscillation axis 17 is only one.

The driver is constituted, for example, by a combination of a permanent magnet and an electromagnetic coil or by a piezoelectric device, and it drives the vibration system so as to torsionally vibrate in at least the two natural oscillation modes about the oscillation axis at the same time. Typically, the vibration system has the two natural oscillation modes with different frequencies. One frequency is substantially twice or triple the other frequency. The first oscillatory moving element, the first torsion spring, the secondary oscillatory moving element, the second torsion spring, and the support can be integrally formed using single-crystal silicon.

By employing the above-described optical deflector in an optical apparatus comprising a light source and a photosensitive member or an image display member, an image forming apparatus, a display, etc. can be constituted in which the optical deflector deflects a light from the light source such that at least a part of the light enters the photosensitive member or the image display member.

The optical deflector for simultaneously exciting a plurality of natural oscillation modes to perform an optical scan can be realized with a small size and a structure capable of easily adjusting respective frequencies of the natural oscillation modes. While downsizing of the above-described known vibration system makes nonlinearity of the torsion spring noticeable and leads to a difficulty in inspecting and adjusting the frequencies of the natural oscillation modes as the driving targets, such a difficulty can be eliminated in the optical deflector according to the present invention. Further, it becomes easy to reduce the size, power consumption, and cost of the optical deflector. Inspection of the frequencies of the natural oscillation modes can be performed, for example, by detecting frequencies and phases corresponding to the progress of changes in mechanical deformations of the torsion springs by using, e.g., strain sensors. Based on the inspection results, the frequencies of the natural oscillation modes can be each adjusted by a temperature adjusting device, such as a heater using an electric resistor.

Exemplary Embodiments

Exemplary embodiments of the present invention will be described below with reference to the drawings.

First Exemplary Embodiment

Figure 1:
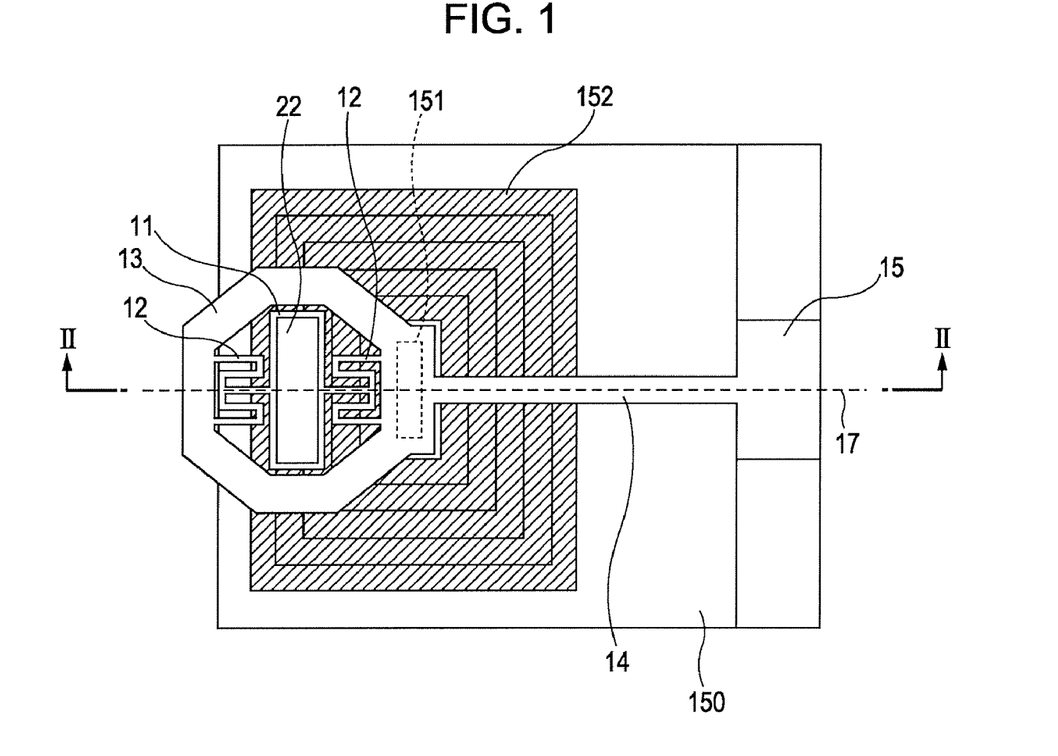
FIG. 1 is a plan view of an optical deflector according to a first exemplary embodiment of the present invention.
Figure 2:
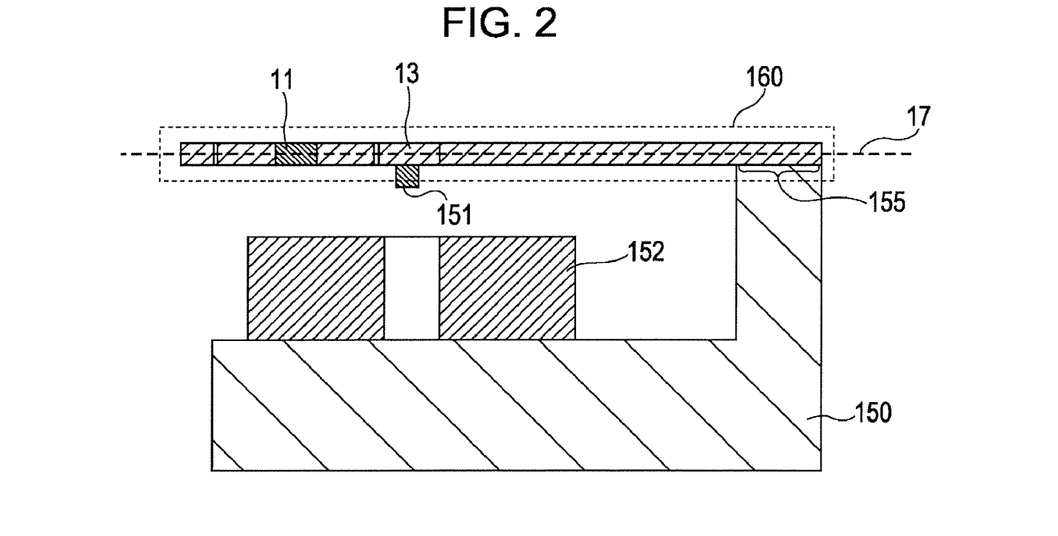
FIG. 2 is a sectional view, taken along a section plane II-II in FIG. 1, of the optical deflector according to the first exemplary embodiment of the present invention.

FIGS. 1 and 2 show a first exemplary embodiment of an optical deflector according to the present invention. FIG. 1 is a plan view, and FIG. 2 is a sectional view taken along a section plane II-II in FIG. 1 which passes an oscillation axis 17 and is perpendicular to the drawing sheet of FIG. 1. A vibration system 160 indicated by a surrounding broken line, shown in FIG. 2, is driven by a driver, described later, so as to torsionally vibrate about the oscillation axis 17. The vibration system 160 is formed as an integral unit from a single-crystal silicon substrate by photolithography and dry etching which are commonly used in the semiconductor manufacturing process. Accordingly, a small-sized vibration system can be formed with high processing accuracy. Further, because single-crystal silicon has a high Young's modulus and a small density, a vibration system can be realized with a small deformation attributable to the dead weight of an oscillatory moving element itself and with a high vibration amplification factor in a resonance state.

A first oscillatory moving element 11 of the vibration system 160 has a size of 3 mm in a direction perpendicular to the oscillation axis 17 and a size of 1 mm in a direction parallel to the oscillation axis 17, while a total length of the vibration system 160 is about 15 mm. The first oscillatory moving element 11 is resiliently supported by a pair of two first torsion springs 12 to be able to torsionally vibrate about the oscillation axis 17. In this exemplary embodiment, particularly, each of the first torsion springs 12 has a meander structure shown in FIG. 1. On the other hand, a second oscillatory moving element 13 is resiliently supported by one second torsion spring 14 having a square column shape to be able to torsionally vibrate about the oscillation axis 17. Thus, the first oscillatory moving element 11 and the second oscillatory moving element 13 are resiliently supported in series to be able to torsionally vibrate about the oscillation axis 17.

Because a reflecting surface 22 is formed on the first oscillatory moving element 11, flatness of the first oscillatory moving element 11 in its driven state is especially important. With the first oscillatory moving element 11 supported at its opposite ends by the pair of two torsion springs 12, a deformation caused by the dead weight can be minimized and flatness can be held at more satisfactory level in comparison with the case of using one torsion spring. Thus, the first oscillatory moving element 11 has the reflecting surface 22 serving as a light deflecting element which deflects a light. Stated another way, a light from a light source is deflected and scanned by the torsional vibrations of the first oscillatory moving element 11. In this exemplary embodiment, the reflecting surface 22 is made of an aluminum film coated by vacuum deposition. The reflecting surface 22 can also be made of another suitable material, e.g., gold or copper. It can be coated with a protective layer at a top surface.

Further, as shown in FIGS. 1 and 2, the optical deflector of this exemplary embodiment includes a stationary body 150 and a driver. The driver in this exemplary embodiment comprises a permanent magnet 151 bonded to the second oscillatory moving element 13, and a stationary coil 152 fixed to the stationary body 150. The permanent magnet 151 is a metallic magnet having a square column shape with a length of about 1 mm and a cross-section of 150 μm×150 μm. The permanent magnet 151 is magnetized in the longitudinal direction thereof and is fixed the second oscillatory moving element 13 by an adhesive. As shown, the stationary body 150 holds the positions of the vibration system 160 and the permanent magnet 151 in a proper relation to the position of the stationary coil 152. When a driving AC current is supplied to the stationary coil 152, a magnetic field is generated in a direction normal to the drawing sheet of FIG. 1. The generated magnetic field gives torque about the oscillation axis 17 to the permanent magnet 151, whereby the vibration system 160 is driven. A support 15 is fixed at its bonding portion 155 to the stationary body 150, as shown in FIG. 2.

More specifically, as shown in FIGS. 1 and 2, the support 15 is fixed only at its bonding portion 155 to the stationary body 150 such that the vibration system 160 is supported by the stationary body 150 like a cantilevered beam. The cantilevered beam structure is effective in reducing stress applied from the stationary body 150 to the torsion springs in the axial direction.

The principle for driving the optical deflector of this exemplary embodiment to vibrate in a sawtooth waveform will be next described in detail. For the torsional vibrations about the torsion axis 17, the vibration system 160 in this exemplary embodiment has a primary natural oscillation mode at a frequency $f_1$ and a secondary natural oscillation mode at nearly second harmonic frequency $f_2$ twice a fundamental frequency $f_0$. Thus, the vibration system 160 can be handled as a two-degree-of-freedom vibration system with respect to the torsional vibrations.

On the other hand, the stationary coil 152 drives the vibration system 160 using a composite driving signal with the fundamental frequency $f_0$, which is a target driving frequency decided based on specifications of an application apparatus, and a frequency $2f_0$ twice the fundamental frequency. The fundamental frequency $f_0$ and the natural oscillation mode frequencies $f_1$ and $f_2$ have the relationships described below. Thus, the optical deflector of this exemplary embodiment performs composite-waveform driving with low power consumption by utilizing a high dynamic-to-static modulus ratio (amplitude amplification factor) in the natural oscillation modes.

In particular, the natural oscillation mode frequency $f_1$ is designed to be set close to the fundamental frequency $f_0$. Assuming here that $\gamma_1$ and $\gamma_2$ denote respective mode attenuation ratios of the primary and secondary natural oscillation modes (each of which represents sharpness of a peak at the natural oscillation mode frequency in a frequency characteristic curve of the dynamic-to-static modulus ratio and is substantially equal to ½Q), a range of the natural oscillation mode frequency $f_1$ is given by:

$$f_0(1-2\gamma_1) < f_1 < f_0(1+2\gamma_1) \quad \text{(Eq. 1)}$$

Further, in this specification, a frequency ratio of the natural oscillation mode frequency $f_1$ to $f_2$ is assumed to have the following range and is called "substantially twice":

$$-2(\gamma_1 + \gamma_2) + 1 < 2\frac{f_1}{f_2} < 2(\gamma_1 + \gamma_2) + 1 \quad \text{(Eq. 2)}$$

In addition, in this exemplary embodiment, the frequency ratio is given by the following range:

$$-(\gamma_1 + \gamma_2) + 1 < 2\frac{f_1}{f_2} < (\gamma_1 + \gamma_2) + 1 \quad \text{(Eq. 3)}$$

In the vibration system 160 of this exemplary embodiment, $\gamma_1$ is about 0.001 and $\gamma_2$ is about 0.00025. As seen from Eqs. 1 to 3, in this exemplary embodiment, vibrations at the frequencies $f_0$ and $2f_0$ are excited by the stationary coil 152 near respective peaks of the two natural oscillation modes, whereby the vibration system 160 is driven. In the range given by Eq. 1, particularly, the power consumption of the optical deflector can be held low because the range where the primary natural oscillation mode has a high dynamic-to-static modulus ratio (amplitude amplification factor) can be utilized for the vibration at the frequency $f_0$ which is a main component of power consumed by the composite driving.

Behaviors of the driving process will be described in more detail below.

Figure 3:
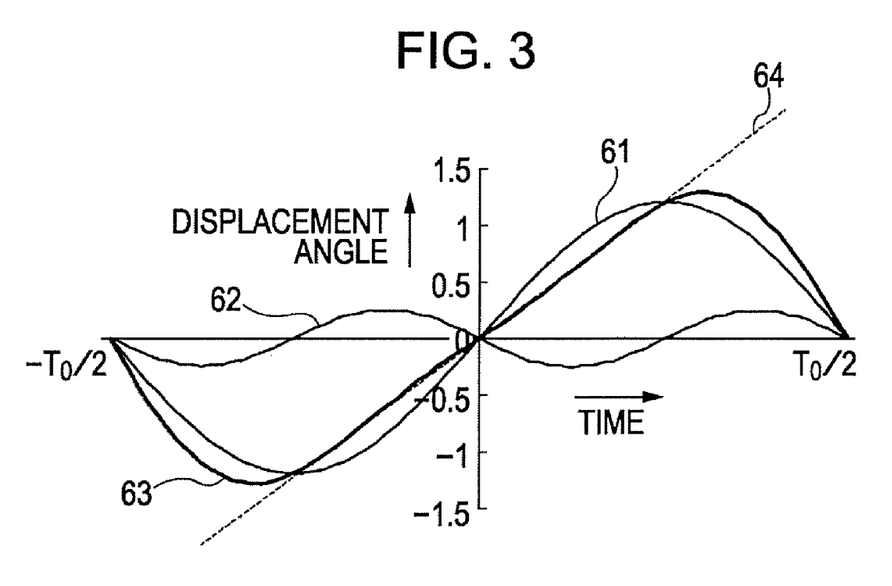
FIG. 3 is a graph showing a displacement angle of a light deflected to make a scan by the optical deflector according to the first exemplary embodiment of the present invention.

FIG. 3 is a graph for explaining a displacement angle of torsional vibrations of the first oscillatory moving element 11 with the horizontal axis indicating a time t (note that, in this specification, a displacement angle of reciprocating vibrations of the moving element and a displacement angle of a light deflected to make a scan by the optical deflector are equivalently handled because the two angles differ from each other just in a constant). FIG. 3 shows, in particular, a region corresponding to one cycle $T_0$ of the torsional vibrations of the first oscillatory moving element 11 (i.e., $-T_0/2 < X < T_0/2$).

A curve 61 represents a component of the fundamental frequency $f_0$ in the driving signal to drive the stationary coil 152. Such a component is a sinusoidal vibration which vibrates reciprocally within the range of a maximum amplitude $\pm\phi_1$ and is expressed by the following Eq. 4 on an assumption of a time=t and an angular frequency $w_0=2\pi f_0$,:

$$\theta_1=\phi_1 \sin [w_0 t] \qquad (\text{Eq. 4})$$

On the other hand, a curve 62 represents a component of the frequency twice the fundamental frequency $f_0$ in the driving signal to drive the stationary coil 152. Such a component is a sinusoidal vibration which vibrates reciprocally within the range of a maximum amplitude $\pm\phi_2$ and is expressed by the following Eq. 5:

$$\theta_2=\phi_2 \sin [2w_0 t] \qquad (\text{Eq. 5})$$

A curve 63 represents the displacement angle of the torsional vibrations of the first oscillatory moving element 11, which is resulted from the above-described driving. As described above, for the torsional vibrations about the torsion axis 17, the optical deflector has the primary natural oscillation mode at the frequency $f_1$ and the secondary natural oscillation mode at the frequency $f_2$ which are adjusted respectively to the vicinity of the fundamental frequency $f_0$ and $2f_0$ twice the fundamental frequency $f_0$. Therefore, the optical deflector causes resonances excited by the above-mentioned driving signals $\theta_1$ and $\theta_2$. In other words, the displacement angle of the first oscillatory moving element 11, represented by the curve 63, provides a vibration resulting from superimposition of the two sinusoidal vibrations, i.e., a sawtooth waveform vibration expressed the following Eq. 6:

$$\theta=\theta_1+\theta_2=\phi_1 \sin [w_0 t]+\phi_2 \sin [2w_0 t] \qquad (\text{Eq. 6})$$

Figure 4:
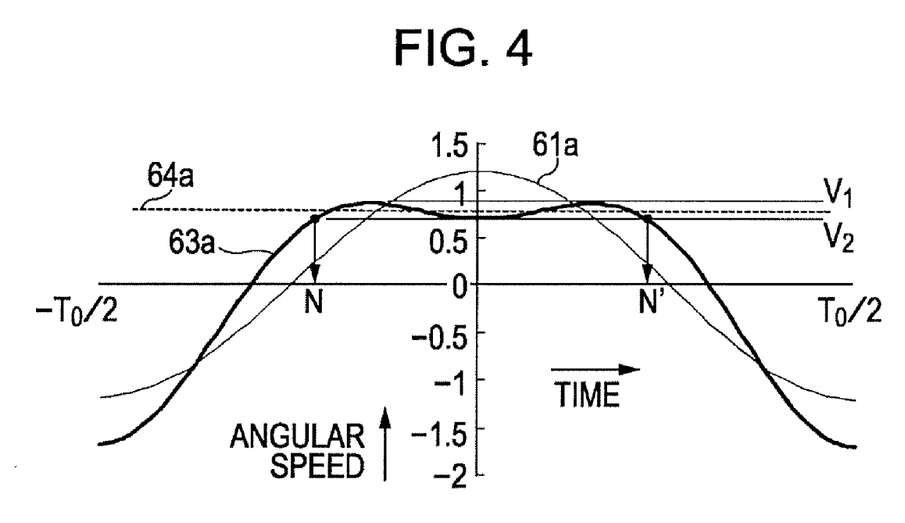
FIG. 4 is a graph showing an angular speed of a light deflected to make a scan by the optical deflector according to the first exemplary embodiment of the present invention.

FIG. 4 shows curved lines 61a, 63a and a linear line 64a resulting from differentiating the curved lines 61, 63 and a linear line 64 in FIG. 3. Namely, FIG. 4 shows angular speeds corresponding to those lines. Comparing with the curved line 61a representing the angular speed of the sinusoidal vibration at the fundamental frequency $f_0$, the curved line 63a representing the sawtooth waveform reciprocal vibration of the first oscillatory moving element 11 varies such that, in a zone N-N', the angular speed is held within the range between an angular speed $V_1$ at a maximum point and an angular speed $V_2$ at a minimum point, i.e., between maximum and minimum angular speeds. In an application utilizing the deflection scan of the light which is performed by the optical deflector, therefore, if $V_1$ and $V_2$ are positioned within an allowable error of the angular speed with respect to the linear line 64a representing an constant angular speed scan, the zone N-N' can be regarded as providing a substantially constant angular speed scan.

The sawtooth waveform reciprocal vibration produces the angular speed of the deflection scan such that a region providing a substantially constant angular speed can be set wider than that in the case where the displacement angle varies in the sine waveform. Thus, a practically available region can be increased with respect to an overall region of the deflection scan. Further, since every scan lines are generated at equal intervals with the sawtooth waveform driving, more preferable application to a printer, etc. can be realized.

While the frequencies $f_1$ and $f_2$ of the natural oscillation modes have been described above as having the substantially twice relationship, the relationship between the two frequencies can be set substantially triple. As in the case where the relationship between the two frequencies is set substantially twice, a triangular waveform vibration is resulted by superimposition of two sinusoidal waveforms. With such a modification, since reciprocal strokes of each optical scan can be utilized, the number of available scan lines at a certain frequency is doubled.

In the optical deflector in which the optical scan is performed by simultaneously exciting two or more natural oscillation modes in the torsionally vibrating direction, the power consumption can be reduced to a lower level as the mode attenuation ratio in each mode has a smaller value. On the other hand, as seen from Eqs. 1-3, the smaller mode attenuation ratios provide narrower setting ranges of the frequencies of the plural natural oscillation modes as the driving targets (i.e., the frequencies $f_1$ and $f_2$ in the optical deflector of this exemplary embodiment). For that reason, to realize low power consumption of the optical deflector, the frequencies of the plural natural oscillation modes have to be adjusted so as to fall within the ranges satisfying Eqs. 1-3.

The natural oscillation modes of a multi-degree-of freedom torsional vibration system are decided depending on the inertial moments of all vibrating bodies and the spring constants of torsion springs which resiliently support the vibrating bodies. Those characteristics are affected by, e.g., manufacturing errors, variations in mechanical characteristics of materials such as Young's modulus and density, and states of static stresses applied from the surroundings. Therefore, in order to inexpensively realize an optical deflector with a plurality of frequencies all adjusted satisfactorily, therefore, it is desired that the plurality of frequencies need to be all easily inspected. With the structure of the known optical deflector, however, a difficulty arises in inspecting the frequencies in a small-sized optical deflector, as explained below.

In the known optical deflector of FIG. 13, the first torsion spring 1018 and the second torsion spring 1020 are each torsion springs in which a beam-like member causes a torsional deformation. In such a torsion spring, when a value $\beta$ (torsion angle per unit length) resulting from dividing a total torsion angle $\Theta$ by a spring length L in the direction of a torsion axis is increased, nonlinearity of the spring attributable to the geometrical shape of the torsion spring becomes noticeable. In the range where the torsion angle is small, the relationship between torque and the torsion angle is proportional and can be expressed by the following Eq. 7 on an assumption of the proportional constant being $K_\theta$ and the torque being T:

$$T=K_\theta \beta \qquad (\text{Eq. 7})$$

On the other hand, when the value of the torsion angle $\beta$ per unit length is increased, a term in proportion to the third power of $\beta$ is noticeable in the relationship between the torque T and the torsion angle $\beta$, as expressed below:

$$T=K_\theta \beta+K'_\theta \beta^3 \qquad (\text{Eq. 8})$$

Accordingly, as the vibration system of the torsion spring has a smaller size, $\beta$ takes a larger value with respect to the total torsion angle $\Theta$ and nonlinearity due to the term of $\beta^3$ tends to be more noticeable. Herein, the coefficient $K'_\theta$ in the term of $\beta^3$ is a constant mainly related to the cross-sectional shape of the torsion spring.

If any of the torsion springs constituting the multi-degree-of-freedom torsional vibration system is used in the range where the nonlinearity expressed by Eq. 8 is noticeable, the vibration system exhibits a characteristic much different from the resonance characteristic of a linear spring expressed by Eq. 7.

Figure 11A:
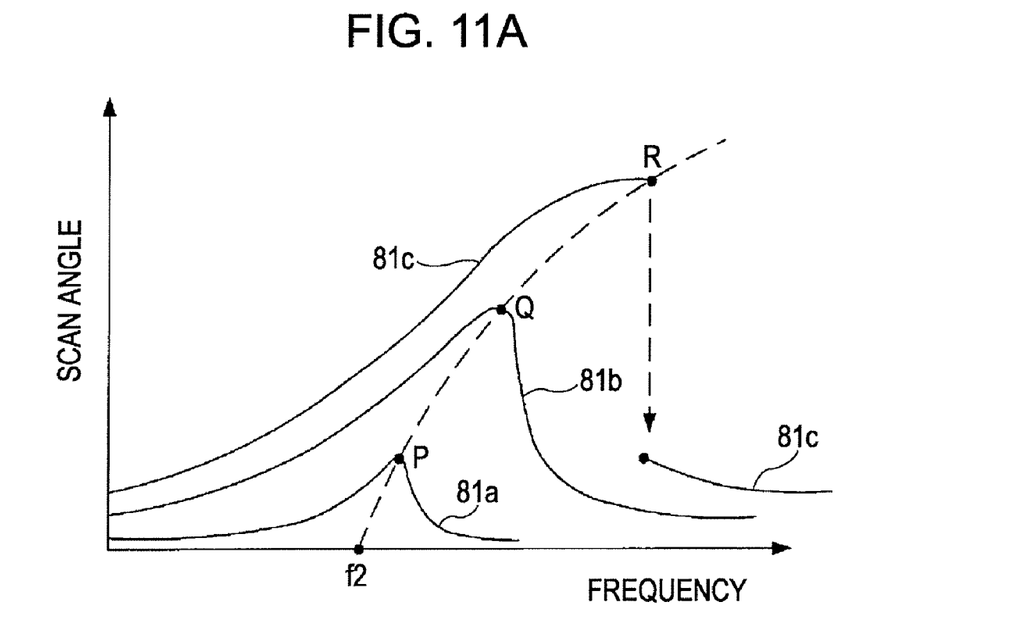
FIG. 11A is a graph showing resonance characteristics when a torsion spring is nonlinear.
Figure 11B:
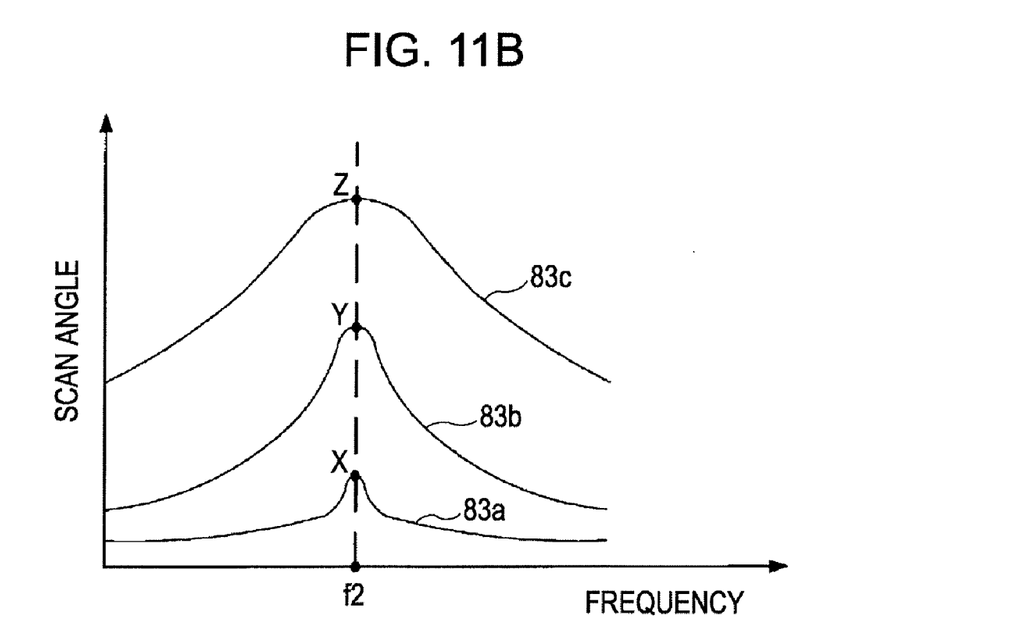
FIG. 11B is a graph showing resonance characteristics when a torsion spring is linear.

FIG. 11A is a graph showing frequency to scan angle characteristics of the natural oscillation mode when the first torsion spring 1018 of the multi-degree-of-freedom torsional vibration system, such as shown in FIG. 13, has the nonlinear characteristic expressed by Eq. 8. On the other hand, FIG. 11B is a graph showing frequency to scan angle characteristics when the first torsion spring 1018 has the linear characteristic expressed by Eq. 7. In each of FIGS. 11A and 11B, the second torsion spring 1020 has the linear characteristic expressed by Eq. 7. In particular, each of the graphs shows a maximum scan angle of the first moving element 1014 when sinusoidal driving torque with a certain magnitude is applied to the vibration system while a frequency is changed near the frequency $f_2$ of the secondary natural oscillation mode in the optical deflector constructed shown in FIG. 13. Curves denoted by 81a, 81b and 81c in FIG. 11A and curves denoted by 83a, 83b and 83c in FIG. 11B represent the cases where maximum values of the applied torque are increased in the order of the suffixes a, b and c. Correspondingly, the scan angles indicated by respective apexes of the curves are also increased as shown.

When the multi-degree-of-freedom torsional vibration system is constituted only by the linear torsion springs, as shown in FIG. 11B, frequencies at respective apexes X, Y and Z of the curves 83a, 83b and 83c are all coincident with $f_2$. In other words, the frequency of the natural oscillation mode is constant regardless of the scan angle of the vibration system. Accordingly, even when the scan angle at the apex Z is actually used, the frequency of the natural oscillation mode can be easily inspected by measuring the frequency while sweeping the frequency at a smaller scan angle. Also, for a plurality of natural oscillation modes, an optical scan can be preformed by simultaneously exciting those modes at the frequencies which have been inspected individually.

On the other hand, when the contribution of the nonlinear torsion spring is large, as shown in FIG. 11A, there occurs a phenomenon that the peak frequency shifts toward the higher frequency side with an increase of the scan angle of the vibration system, as indicated by the apexes P, Q and R of the curves 81a, 81b and 81c. Stated another way, the frequency of the natural oscillation mode is changed depending on the scan angle of the vibration system. Unlike the case of FIG. 11B, therefore, in the natural oscillation mode with the nonlinear torsion spring having a large contribution, it is required to inspect the frequency which is obtained when the nonlinear torsion spring is torsionally deformed in the same amount as that corresponding to the scan angle actually used.

In the primary natural oscillation mode, the first moving element 1014 and the second moving element 1016 are both caused to torsionally vibrate in the same phase. In the secondary natural oscillation mode, the first moving element 1014 and the second moving element 1016 are caused to torsionally vibrate in different phases that are reversal to each other. The difference in the scan angle between the first moving element 1014 and the second moving element 1016 provides the total torsion angle $\Theta$ of the first torsion spring 1018. In order to torsionally deform the first torsion spring 1018 in the same amount as that in the actually used case, therefore, both the primary and secondary natural oscillation modes utilized in the optical scan have to be excited to produce the actually used scan waveform for the first moving element 1014 instead of exciting only one natural oscillation mode.

However, the relationships in response phase delay of the first moving element 1014 and the second moving element 1016 between the scan angle and the driving torque are changed depending on the inertial moments of the two moving elements and the spring constants of the first torsion spring 1018 and the second torsion spring 1020. Further, as described above, there is a risk that those values are changed under various influences, such as manufacturing errors, variations in mechanical characteristics, and states of stresses applied from the surroundings. This means it is necessary to set the proper driving torque for each of individual moving elements and environments so that the first moving element 1014 is vibrated in the scan waveform actually used. As a result, the inspection of the frequency of the natural oscillation mode becomes more troublesome than the case of FIG. 11B.

Further, other frequency components than the target frequency of the natural oscillation mode are also excited at the same time. Accordingly, an additional process, such as a frequency analysis for extracting the target frequency component of the natural oscillation mode from the measured waveform, is required, thus increasing the intricacy.

Still further, the total torsion angle $\Theta$ (i.e., the difference in the scan angle between the two moving elements) of the first torsion spring 1018 has a variation in contribution to the frequencies of the natural oscillation modes in the same phase and in different phases which are reversed to each other. Therefore, the total torsion angle $\Theta$ of the first torsion spring 1018 is changed even at the same scan angle, whereby the frequencies of the natural oscillation modes are shifted correspondingly. As a result, the number of factors causing frequency variations with respect to the design value is increased.

Thus, in the multi-degree-of-freedom torsional vibration system having the torsion springs, as shown for example in FIG. 13, when the size is reduced, the nonlinear characteristic of the torsion spring becomes noticeable and the frequency of the natural oscillation mode becomes not constant with respect to the scan angle.

To overcome the problems with the known optical deflector, in the vibration system 160 of this exemplary embodiment, the first torsion spring 12 is formed to have a structure shown in FIGS. 5A-5C. FIG. 5A is a plan view of the first torsion spring 12, at an enlarged scale, of the optical deflector according to the first exemplary embodiment shown in FIG. 1. FIG. 5B is a schematic view showing different functional components of the first torsion spring 12. FIG. 5C is a sectional view of the first torsion spring 12 taken along a section plane VC-VC perpendicular to the oscillation axis 17 shown in FIG. 5A. As shown in FIGS. 5A-5C, the first torsion spring 12 has five torsion leaf portions 24a, 24b, 24c, 24d and 24e which are torsionally deformed about respective torsion axes 23 parallel to the oscillation axis 17. Opposite ends of the five torsion leaf portions are fixed, as shown, to corresponding ones of connecting portions 25a, 25b and 25c, the first oscillatory moving element 11, and the second oscillatory moving element 13. Further, two pairs of the torsion leaf portions 24a and 24b and the torsion leaf portions 24d and 24e are coupled per pair so as to cause torsional deformations in series, thereby forming two similar components which are coupled to each other in parallel. The two similar components are coupled to the torsion leaf portion 24c in series.

Also, as shown in FIG. 5C, when the first torsion spring 12 is cut along the section plane VC-VC perpendicular to the oscillation axis 17, it has five cross-sections corresponding to the torsion leaf portions 24a, 24b, 24c, 24d and 24e. In this specification, such an arrangement as providing two or more cross-sections of the coupled torsion leaf portions, which are perpendicular to the oscillation axis 17, is called a meander structure. With the meander structure, the first torsion spring 12 is formed so as to have a relatively short overall length in the direction of the oscillation axis 17. Accordingly, the overall length of the optical deflector can be reduced.

In the first torsion spring 12 according to the first exemplary embodiment, by repetitively connecting the torsion leaf portions 24a, 24b and the coupling portion 25a as one unit, the torsion angle β per unit length with respect to the total torsion angle Θ can be reduced without increasing the overall length of the first torsion spring 12 in the direction of the oscillation axis. As a result, since the first torsion spring 12 has a small size and good linearity, the frequencies of the natural oscillation modes can be all easily inspected. In addition, it is possible to reduce the above-described variations in the frequency and to realize a multi-degree-of-freedom torsional vibration system in which all the frequencies can be satisfactorily adjusted.

Further, in the optical deflector according to the first exemplary embodiment, the inertial moment of the second oscillatory moving element 13 is about 15 times larger than that of the first oscillatory moving element 11. Since the frequencies $f_1$ and $f_2$ of the natural oscillation modes of the vibration system 160 have the relationship of 1:2, the spring constant of the second torsion spring 14 is about 4.5 times larger than that of the first torsion spring 12. This point also contributes to facilitating the inspection and adjustment of the frequencies of the natural oscillation modes. Moreover, in the first torsion spring 12 according to the first exemplary embodiment, since the torsion spring constant is substantially in proportion to the third power of the width W as described above in connection with FIG. 12, relatively large compliance can be obtained even when the width W is increased with respect to the thickness H. The springs used in the optical deflector according to the first exemplary embodiment are manufactured by dry etching. Therefore, a variation in the spring constant due to an etching process can be reduced by setting the width W to be larger with respect to errors in the etching process.

As described above, the optical deflector according to the first exemplary embodiment, which performs an optical scan by simultaneously exciting a plurality of natural oscillation modes, can be obtained in small size with a structure capable of easily adjusting respective frequencies of the natural oscillation modes.

Second Exemplary Embodiment

Figure 6:
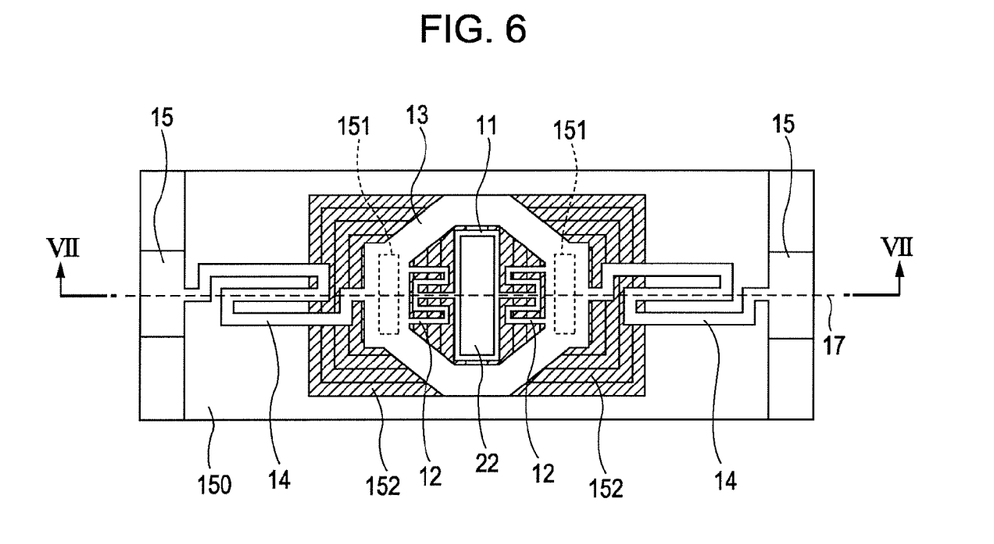
FIG. 6 is a plan view of an optical deflector according to a second exemplary embodiment of the present invention.
Figure 7:
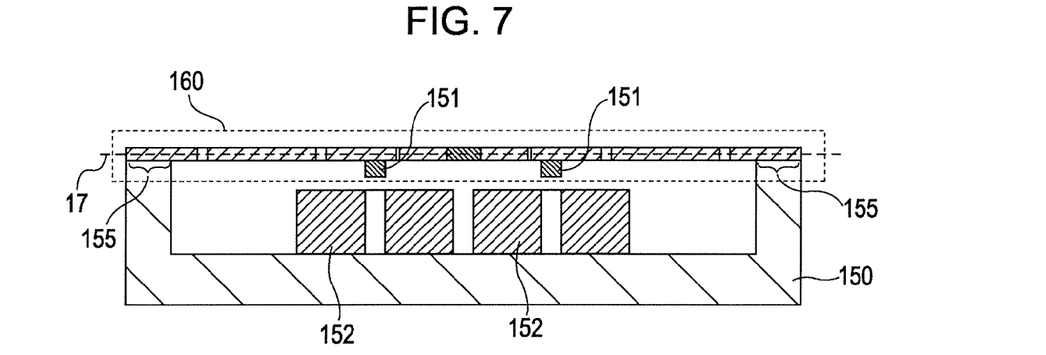
FIG. 7 is a sectional view, taken along a section plane VII-VII in FIG. 1, of the optical deflector according to the second exemplary embodiment of the present invention.

FIG. 6 is a plan view of an optical deflector according to a second exemplary embodiment of the present invention. FIG. 7 is a sectional view of the optical deflector taken along a section plane VII-VII in FIG. 6 which passes the oscillation axis 17 in FIG. 6 and perpendicular to the drawing sheet. In FIGS. 6 and 7, components having similar functions to those in the first exemplary embodiment are denoted by the same reference characters and a description of those components is omitted here. The following description is made primarily of different points from the first exemplary embodiment.

In the optical deflector according to the second exemplary embodiment, as shown in FIG. 6, the first oscillatory moving element 11, the first torsion spring 12, the support 15, and the reflecting surface 22 of the vibration system 160 are made of similar materials and have similar structures and functions to those in the first exemplary embodiment. However, the second torsion spring 14 in the second exemplary embodiment has a meander structure, which comprises a pair of two springs, instead of the one torsion spring having the square column shape in the first exemplary embodiment.

Further, as shown in FIG. 7, a driver includes a pair of two permanent magnets 151 and a pair of two stationary coils 152. The driving principle is the same as that in the first exemplary embodiment. Specifically, the two permanent magnets 151 and the two stationary coils 152 drive the first oscillatory moving element 11 in accordance with Eq. 6, thereby scanning a light with torsional vibrations represented by the curve 63 in FIG. 3.

Figure 8A:
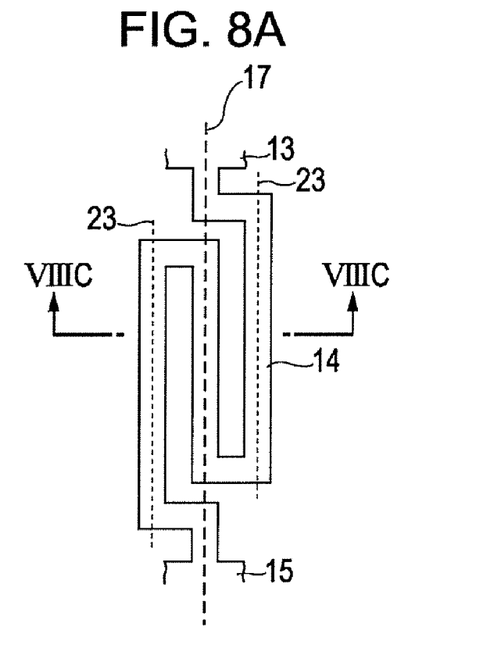
FIG. 8A is a plan view of a second torsion spring of the optical deflector according to the second exemplary embodiment of the present invention.
Figure 8B:
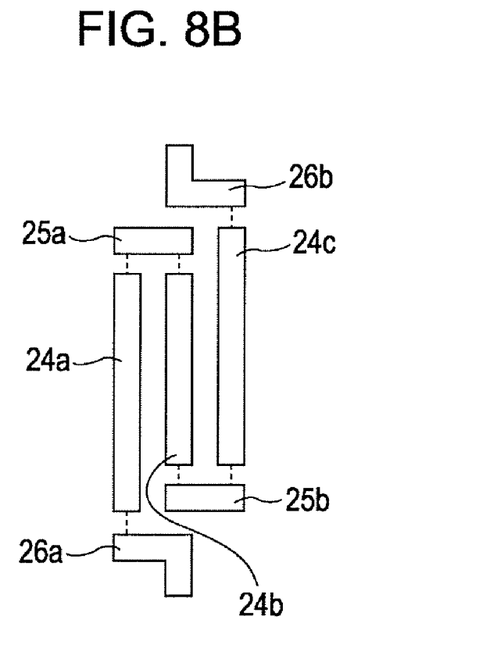
FIG. 8B is a schematic view showing functional components of the second torsion spring of the optical deflector according to the second exemplary embodiment of the present invention.
Figure 8C:
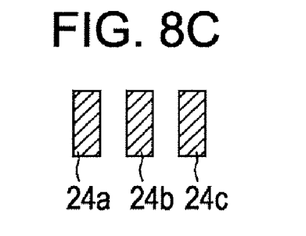
FIG. 8C is a sectional view of the second torsion spring of the optical deflector according to the second exemplary embodiment of the present invention.

FIG. 8A is a plan view of the second torsion spring 14, shown in FIG. 6, at an enlarged scale. FIG. 8B is a schematic view showing different functional components of the second torsion spring 14. FIG. 8C is a sectional view of the second torsion spring 14 taken along a section plane VIIIC-VIIIC perpendicular to an oscillation axis 17 shown in FIG. 8A. As shown in FIGS. 8A-8C, the second torsion spring 14 has three torsion leaf portions 24a, 24b, and 24c which are torsionally deformed about respective torsion axes 23 parallel to the oscillation axis 17. Opposite ends of the three torsion leaf portions are fixed, as shown, to corresponding ones of connecting portions 25a, 25b and other connecting portions 26a, 26b. Thus, the second oscillatory moving element 13 is resiliently supported by the torsion leaf portions 24a, 24b and 24c which are coupled in series.

Also, as shown in FIG. 8C, when the second torsion spring 14 is cut along the section plane VIIIC-VIIIC perpendicular to the oscillation axis 17, it has three cross-sections corresponding to the torsion leaf portions 24a, 24b and 24c. In other words, the second torsion spring 14 has a meander structure having two or more cross-sections of the torsion leaf portions coupled to each other, which are cut along a plane perpendicular to the oscillation axis 17. As a result, since the second torsion spring 14 according to this second exemplary embodiment has a small size and good linearity as with the first torsion spring 12, the frequencies of the natural oscillation modes can be all more easily inspected. In addition, it is possible to reduce the above-described variations in the frequency and to realize a multi-degree-of-freedom torsional vibration system which can satisfactorily adjust all the frequencies.

Figure 9B:
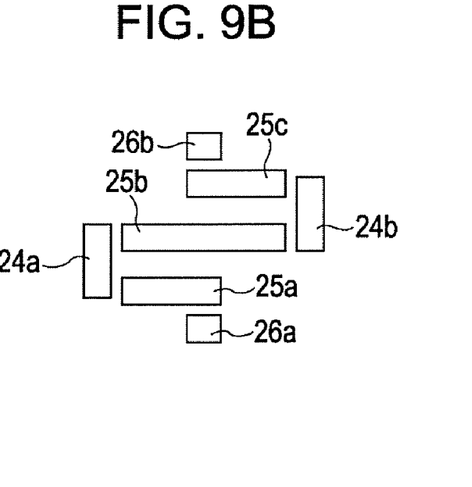
FIG. 9B is a schematic view showing functional components of the torsion spring of the optical deflector according to the modification of the second exemplary embodiment of the present invention.

Meanwhile, the second torsion spring 14 can also be formed as a spring having a serpentine structure shown in FIGS. 9A and 9B. FIG. 9A is a plan view, and FIG. 9B is a schematic view showing different functional components. As shown in FIG. 9A, the serpentine spring according to this modification has two torsion leaf portions 24a and 24b which are torsionally deformed about respective torsion axes 23 parallel to the oscillation axis 17. In the serpentine spring having the structure shown in FIGS. 9A and 9B, the number of cross-sections perpendicular to the oscillation axis 17 is only one. Opposite ends of the two torsion leaf portions are fixed, as shown, to corresponding ones of connecting portions 25a, 25b and 25c. With such an arrangement, the second torsion spring 14 can be formed as a satisfactory linear spring by setting the connecting portions 25a, 25b and 25c to have larger lengths. Thus, since the second torsion spring 14 according to this modification also has a small size and good linearity, the frequencies of the natural oscillation modes can be all more easily inspected. In addition, it is possible to reduce the above-described variations in the frequency and to realize a multi-degree-of-freedom torsional vibration system in which all the frequencies can be satisfactorily adjusted.

According to the second exemplary embodiment, particularly, since each of the first torsion spring 12 and the second torsion spring 14 has the meander structure, the overall length of the vibration system 160 can be further reduced.

Third Exemplary Embodiment

Figure 10:
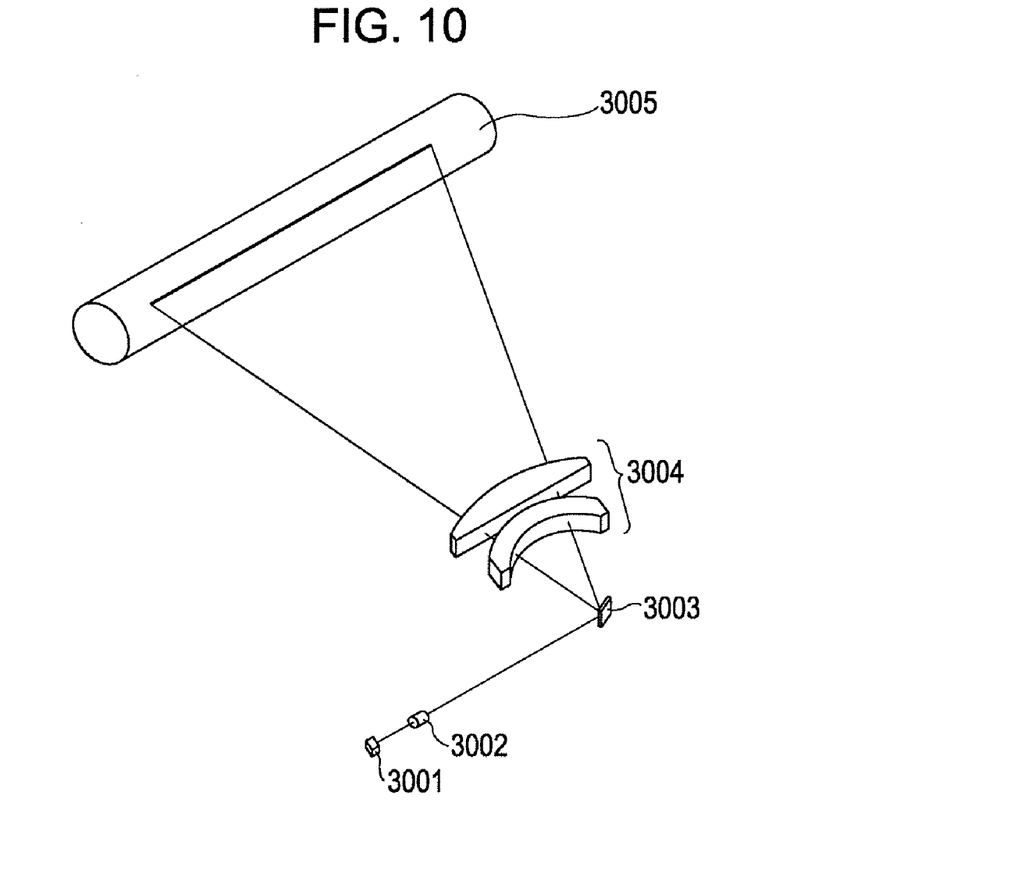
FIG. 10 is a schematic perspective view of an optical apparatus according to a third exemplary embodiment of the present invention, which employs the optical deflector according to any of the first and second exemplary embodiments.

FIG. 10 is a schematic perspective view of an optical apparatus according to a third exemplary embodiment of the present invention, which employs the optical deflector according to any of the first and second exemplary embodiments. Herein, an image forming apparatus is shown, by way of example, as the optical apparatus. As shown in FIG. 10, the image forming apparatus includes an optical deflector 3003 according to the present invention, which scans an incident light one-dimensionally in this exemplary embodiment. The image forming apparatus further includes a laser beam source 3001, a lens or a lens group 3002, a write lens or a write lens group 3004, and a drum-shaped photosensitive member 3005.

A laser beam emitted from the laser beam source 3001 is subjected to predetermined intensity modulation in sync with the timing of a deflection scan of the beam (light). The intensity modulated beam passes through the lens or lens group 3002 and is one-dimensionally scanned by the optical scanning system (optical deflector) 3003. The scanned laser beam forms an image on the photosensitive member 3005 through the write lens or write lens group 3004.

The photosensitive member 3005 is rotated about a rotary shaft extending perpendicularly to the scanning direction and is uniformly charged by a charger (not shown). When the laser beam is scanned over the uniformly charged photosensitive member 3005, an electrostatic latent image is formed in the scanned area. Then, a toner image is formed in the area of the electrostatic latent image by a developer (not shown). By transferring and fusing the toner image onto a sheet (not shown), for example, a permanent image is formed on the sheet.

By employing the optical deflector 3003 according to the present invention, an angular speed of the beam deflection scan can be held substantially constant within a specified range on the photosensitive member 3005. Further, by employing the optical deflector 3003 according to the present invention, an image forming apparatus can be realized with a smaller size and lower power consumption.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2006-147307 filed May 26, 2006, which is hereby incorporated by reference herein in its entirety.

What is claimed is:

1. An optical deflector comprising:
a vibration system including a first oscillatory moving element, a second oscillatory moving element, a first torsion spring arranged to couple the first and second oscillatory moving elements and to support the first oscillatory moving element in an oscillating relation to the second oscillatory moving element, a support, and a second torsion spring arranged to couple the support and the second oscillatory moving element and to support the second oscillatory moving element in an oscillating relation to the support coaxially with an oscillation axis of the first oscillatory moving element; and
a driver arranged to drive the vibration system,
wherein at least one of the first and second oscillatory moving elements has a light deflecting element,
the vibration system has at least two natural oscillation modes with different frequencies about the oscillation axis,
at least one of the first torsion spring and the second torsion spring has a plurality of torsion leaf portions which are torsionally deformed about respective torsion axes parallel to the oscillation axis,
one of the ends of each torsion leaf portion is coupled to an end of another torsion leaf portion through a connecting portion, and
the other end of each torsion leaf portion is coupled directly, or through a connecting portion, to at least one of another torsion leaf portion, the first oscillatory moving element, the second oscillatory moving element, and the support.

2. The optical deflector according to claim 1, wherein torque applied to the torsion spring having the plurality of torsion leaf portions is in a linear relation to a torsion angle per unit length of the torsion spring.

3. The optical deflector according to claim 1, wherein, in the torsion spring having the plurality of torsion leaf portions, the torsion leaf portions are coupled to each other in a meander structure.

4. The optical deflector according to claim 1, wherein the first torsion spring is the torsion spring having the plurality of torsion leaf portions.

5. The optical deflector according to claim 4, wherein the second torsion spring has a cantilevered-beam structure.

6. The optical deflector according to claim 1, wherein the driver drives the vibration system to torsionally vibrate in at least the two natural oscillation modes about the oscillation axis at the same time.

7. An image forming apparatus comprising:
a light source;
the optical deflector according to claim 1; and
a photosensitive member,
wherein the optical deflector deflects a light from the light source such that at least a part of the light exposes the photosensitive member.

8. An image display apparatus comprising:
a light source;
the optical deflector according to claim 1; and
an image display member,
wherein the optical deflector deflects a light from the light source such that at least a part of the light is projected on the image display member.

* * * * *

UNITED STATES PATENT AND TRADEMARK OFFICE
CERTIFICATE OF CORRECTION

PATENT NO. : 7,355,774 B2
APPLICATION NO. : 11/739968
DATED : April 8, 2008
INVENTOR(S) : Takahisa Kato et al.

It is certified that error appears in the above-identified patent and that said Letters Patent is hereby corrected as shown below:

ON THE TITLE PAGE:
At Item (74) Attorney, Agent, or Firm, "Fitzpatrick Cella Harper Scinto" should read --Fitzpatrick, Cella, Harper & Scinto--.

COLUMN 2:
Line 28, "that" should read --such that--.

COLUMN 9:
Line 49, "an constant" should read --a constant--.
Line 58, "every" should read --all of the--.

COLUMN 10:
Line 19, "multi-degree-of free-" should read --multi-degree-of-free- --.

COLUMN 11:
Line 54, "reversal to" should read --reverse of--.

Signed and Sealed this

Seventeenth Day of February, 2009

JOHN DOLL
*Acting Director of the United States Patent and Trademark Office*